United States Patent [19]

Harlan et al.

[11] Patent Number: 5,062,086

[45] Date of Patent: Oct. 29, 1991

[54] CALCULATION OF RAYPATHS AND WAVEPATHS FROM TRAVELTIME TABLES FOR THE TOMOGRAPHIC ESTIMATION OF TRANSMISSION VELOCITIES

[75] Inventors: William S. Harlan; Shein S. Wang; Douglas W. Hanson, all of Ponca City, Okla.

[73] Assignee: Conoco Inc., Ponca City, Okla.

[21] Appl. No.: 573,595

[22] Filed: Aug. 27, 1990

[51] Int. Cl.$^5$ ............................................... G01V 1/28
[52] U.S. Cl. ......................................... 367/38; 367/73
[58] Field of Search .................... 367/38, 73, 50, 59; 364/421

[56] References Cited

U.S. PATENT DOCUMENTS

| | | | |
|---|---|---|---|
| 4,330,872 | 5/1982 | Bratton | 367/43 |
| 4,736,347 | 4/1988 | Goldberg et al. | 367/53 |
| 4,839,869 | 6/1989 | Corcoran | 367/53 |
| 4,884,248 | 11/1989 | Laster et al. | 367/73 |

OTHER PUBLICATIONS

Ivansson, S.; "A Study of Methods for Tomographic Velocity Estimation in the Presence of Low Velocity Zones", Geophysics, vol. 50, #6, pp. 969-988, Jun. 1988.
Numerical Recipes, Press et al., 1986, Cambridge Univ. Press, Chapter 16, "Two Point Boundary Value Problems", pp. 578-614.
1989 International Mtg. and Exposition, article entitled, "Efficient Seismic Ray Tracing Using Graph Theory", by T. J. Moser, pp. 1106-1108.
1989 International Mtg. and Exposition, article entitled, "Finite Difference Calculation of Traveltimes in 3-D", by John E. Vidale, pp. 1096-1098.

Primary Examiner—Ian J. Lobo

[57] ABSTRACT

A method for calculation of raypaths and wavepaths from traveltime tables for the tomographic estimation of transmission velocities includes picking the earliest traveltime of waves transmitted between different source and receivers locations. A velocity model that describes transmission velocities in a region of interest is obtained. Traveltime from each source position to each point in the region of interest and traveltimes from each receiver loaction to each point in the region of interest are extrapolated. The extrapolated traveltimes from the source and receiver to each point in the region of interest are added together to quantify the path of a wave between one source and one receiver. All points in the region of interest whose total traveltimes are less than half a wavelength greater than the minimum traveltime are found. A representative raypath that passes through the center of the estimated wavepath region for each source and receiver location are saved. The previous model of velocities are improved by tomographic means to increase the match between the recorded and modeled traveltimes along the representative raypaths.

7 Claims, 4 Drawing Sheets

CALCULATION OF RAYPATHS AND WAVEPATHS FROM TRAVELTIME TABLES FOR THE TOMOGRAPHIC ESTIMATION OF TRANSMISSION VELOCITIES

BACKGROUND OF THE INVENTION

1. Field of the Invention

The present invention pertains to the estimation of transmission velocities and more particularly to tomographic estimation of transmission velocities by first calculating raypaths and wavepaths from traveltime tables.

2. Related Prior Art

Prior art has illustrated ways of determining raypaths and wavepaths for the tomographic estimation of transmission velocities.

In one method, traveltimes have been generated synthetically from models containing isolated perturbations of velocities, which are then reconstructed tomographically. This method only shows the resolution at a single point. In a second method, raypaths are traced between source and receiver pairs for a particular velocity model by shooting or relaxation methods. Each raypath represents only an infinitesimal amount of energy and may behave pathologically in regions with strong velocity contrasts.

A cross-well, shear-wave data set posed two problems. First, wells are separated by only twelve and one half wavelengths, so thin raypaths are a poor approximation. Second, data are recorded through a high-velocity limestone surrounded by low-velocity shales. Waves are bent considerably, so either refracted or direct arrivals can arrive first. Only first-arrivals can be picked with any reliability.

Like velocity analysis, traveltime tomography estimates a velocity model that explains the arrival times and moveouts of coherent arrivals. Traveltime tomography is most sensitive to smooth background changes in transmission velocities, those changes which must be known for depth migration or diffraction tomography.

Current methods of seismic traveltime tomography use a variety of methods described as "ray-tracing" or "ray-shooting". These methods invoke Snell's law at boundaries of cells of constant velocity or dynamically extrapolate differential ray equations. Other alternatives include relaxation methods. Prior art has produced methods that constrain raypaths as a sum of low-order sinusoids and minimizes traveltimes with a simplex search algorithm. Other methods have been proposed applying perturbation theory directly to finite-difference extrapolations of the Eikonal equation.

All these methods assume asymptotically infinite frequencies in the source, and by implication, infinitely thin raypaths. However, frequency content can limit tomographic resolution more drastically than angular coverage. Recent methods have built on earlier methods to replace raypaths in tomography by "band-limited raypaths" or "wavepaths".

Examples of methods by which prior art has illustrated ways of estimating transmission velocities are as follows.

In the publication *Numerical Recipes*, Press et al, 1986, Cambridge Univ. Press, Chapter 16, "Two Point Boundary Value Problems", discusses numerical shooting and relaxation methods.

The publication by Society of Exploration Geophysicists expanded abstracts from the 1989 International Meeting and Exposition included an article titled "Efficient Seismic Ray Tracing Using Graph Theory" by T. J. Moser. This article discussed a method which proposed that the shortest path method is an efficient, accurate and flexible way to compute raypaths. Not only rays corresponding to first arrivals can be found, but also reflections on interfaces and other later arrivals. The method can be generalised and then applied to a much wider class of problems, like modeling of non-point sources, exploding reflectors and migration of traveltime data. Other graphtheoretical algorithms, like the second shortest path procedure and the reoptimisation of shortest paths, have practical applications in seismics.

Society of Exploration Geophysicists expanded abstracts from the 1989 International Meeting and Exposition, also included an article by John E. Vidale titled "Finite-Difference Calculation of Traveltimes in 3-D". This article stated that the travel times of first arriving seismic rays through most velocity structures can be rapidly computed on a three-dimensional numerical grid by finite-difference extrapolation. Head waves are properly treated and shadow zones are filled by the appropriate diffractions. Differences of less than 0.11 percent were found between the results of this technique and ray-tracing for a complex model. This scheme has proven useful for earthquake location, and shows promise as an inexpensive, well behaved substitute for ray-tracing in forward-modeling and Kirchhoff inversion applications.

U.S. Pat. No. 4,330,872, "Common-Offset-Distance Seismic Trace Filtering", issued to Robert H. Bratton, relates to a multiple coverage seismic exploration technique providing for a plurality of seismic trace recordings along a line of exploration. From these recordings, sets of common-offsetdistance traces are gathered. Initial estimates are made of the apparent dips associated with the seismic reflection signals across each set of common-offset-distance traces. These initial dip estimates are smoothed and the sets of common-offset-distance traces filtered along the apparent dips associated with the smoothed dip estimates to enhance the signal-to-noise ratio of the primary reflection signals.

U.S. Pat. No. 4,839,869, "Methods for Processing Converted Wave Seismic Data", issued to *Chris T. Corcoran*, relates to methods for processing converted wave seismic data which includes, fractional point gathering of the data in a manner consistent with a selected velocity model, dynamic correction of the data using parameters measured from the data to account for the asymmetric travel path of the converted wave rays and stacking the dynamically corrected data. Methods are also provided for updating the velocity model.

SUMMARY OF THE INVENTION

The present invention provides a method for determining the potential resolution of wave velocities from the tomographic inversion of traveltimes between different source and receiver locations. Representative raypaths for use in tomographic inversions are calculated using the present invention by accounting for the limited bandwidth of sources.

Ray tracing is avoided entirely by extrapolating traveltimes explicitly from sources or receivers to every point in a region of interest. Rather than search for a single fastest raypath, the method of the present invention finds Fresnel regions containing all paths that add constructively to first-arrivals. The method of the present invention also finds minimum traveltimes, whether direct or refracted.

The resolution of the estimated velocity model is controlled explicitly with basis functions of adjustable width. Wavepaths and velocities are estimated alternately. As the accuracy of paths improves, velocities are allowed to introduce sharper detail. Two-dimensional detail is introduced only as is necessary.

DESCRIPTION OF THE PREFERRED EMBODIMENT

Figure 1:
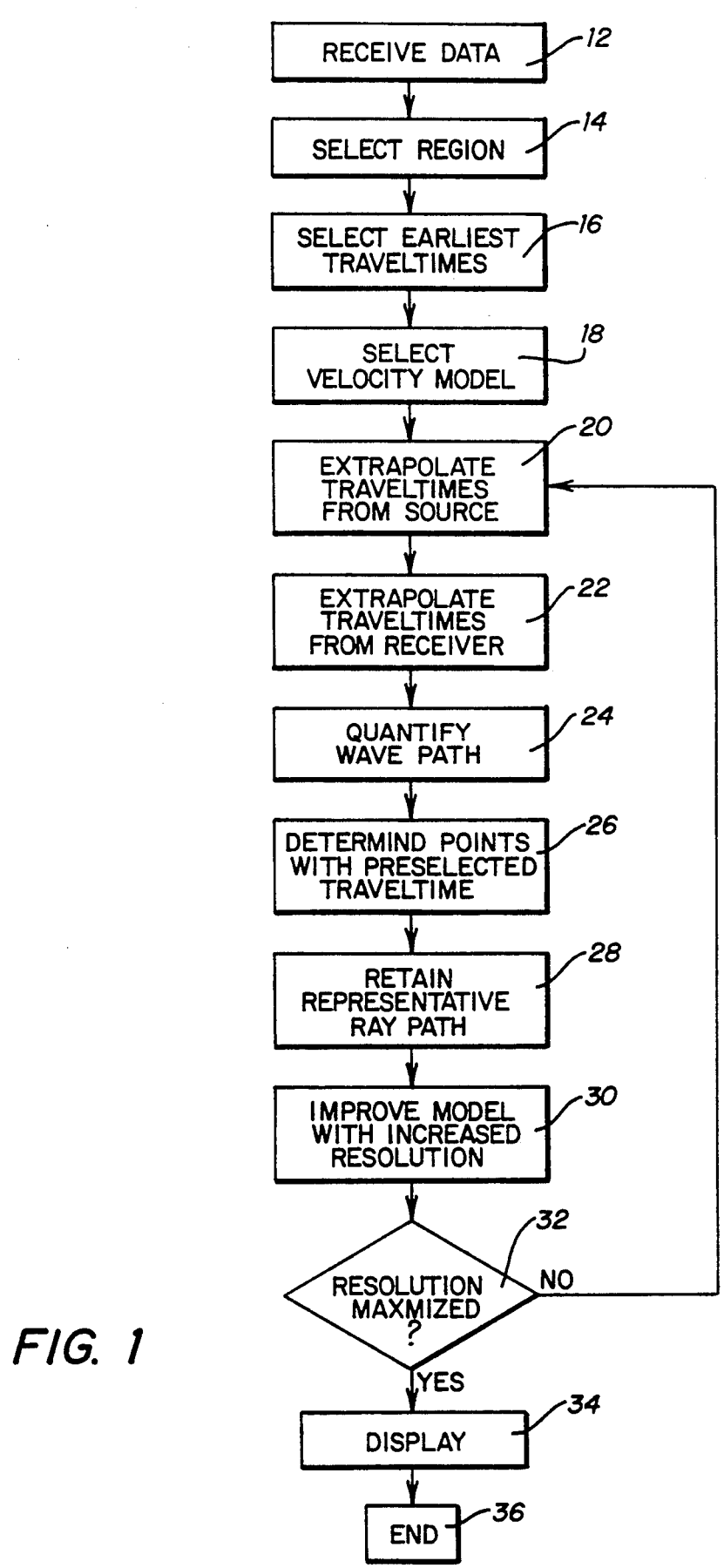
FIG. 1 is a block diagram of a flow chart of the method of the present invention.

The present invention provides a method and apparatus for calculating raypaths and wavepaths from traveltime tables for the tomographic estimation of transmission velocities. Referring now to FIG. 1, the method of the present invention of estimating seismic transmission velocities by determining seismic wavepaths from traveltime tables is illustrated as a flow chart in block form.

Raw data is received at block 12. This data may take any form that is currently available in the art. This data is generally seismic data from seismic pulses generated by sources into the earth's surface and detected by receivers. At block 14 a region of interest is selected. The region of interest includes all points which may influence a wavepath and whose velocity requires optimization. At block 16 the earliest traveltimes of waves transmitted between different source and receivers locations for this region of interest are picked.

With new explicit schemes (e.g., Moser, 1989) traveltimes from sources or receivers to every point in a region of interest can be extrapolated. Rather than search for a single fastest raypath, Fresnel regions containing all paths that add constructively to first-arrivals can be found. This approach robustly finds minimum traveltimes, whether direct or refracted, in complicated media with large velocity contrasts.

Selecting a velocity model that describes transmission velocities in the region of interest is performed at block 18. A velocity model is proposed that describes transmission velocities in the region of interest. This should cover all regions between source and receiver locations.

The velocity model can be constrained as a sum of smooth basis functions of adjustable width in all dimensions (cf. Harlan, 1989). As alternately re-estimated wavepaths and velocities improve, the resolution of the velocity model can be allowed to increase—first vertically, then over all dimensions. The result is the smoothest, most stratified velocity model that explains the data.

At block 20 the step of extrapolating traveltimes from each source position to each point in the region of interest is performed. At block 22 extrapolating traveltimes from each receiver location to each point in the region of interest is performed.

This is done by, with an explicit scheme, extrapolating minimum traveltimes from one source position to each point in the region of interest. Explicit schemes include finite-difference extrapolation of the Eikonal equation (Vidale, 1989), or the "graph theory" method of Moser, 1989, which is used in the present invention. Similarly, extrapolate traveltimes from one receiver location to each point in the region of interest.

Next, at block 24 the path of a wave between one source and one receiver is quantified by adding together the extrapolated traveltimes from the source and receiver to each point in the region of interest. The global minimum traveltime of the resulting table is the minimum traveltime between this source and receiver. This minimum is realized at both the source and receiver locations and also at each point along the raypath with the minimum traveltime, according to Fermat's theorem.

At block 26, all points in the region of interest whose total traveltimes are less than half a wavelength greater than a predetermined minimum traveltime is determined. This collection of points can be called the fastest "wavepath" from the source receiver. Each point of the wavepath is crossed by an alternative raypath whose total traveltime differs little from the global minimum. Each alternative raypath then contributes constructively to the first arriving wave from the source to the receiver. A perturbation of the velocity at any point along the wavepath will affect the character of the first arriving wave.

A representative raypath that passes through the center of the estimated wavepath region for each source and receiver location is retained at block 28. The variable thickness of the wavepath can be preserved as well. These thicknesses represent a physical limit to the potential resolution of local velocities from picked traveltimes.

The model of velocities is improved by tomographic means at block 30 to increase the match between the recorded and modeled traveltimes along the representative raypaths. During the first pass through block 30, the velocity model is constrained to change very smoothly, for low spatial resolution. Each time that block 30 is repeated, the resolution of the velocity model is increased, to allow for the increasing accuracy of the estimated paths.

At block 32, the process branched. If the maximum resolution has not yet been achieved, then the process is repeated by returning to block 20 and reestimation paths. Otherwise, the model is displayed at block 34 and the process ends at block 36. The only restraint is that the velocity model cannot be allowed to change rapidly over the width of any wavepath.

The cross-well data illustrated in the present application were recorded at a Borehole Test Facility. A source provided a rotary motion in one well while three-component accelerometers recorded the transmitted motion in a well eighty-eight and six tenths meters away. Two directions of rotary motion were later decomposed into in line compressional motion and cross-line shear motion.

Figure 2:
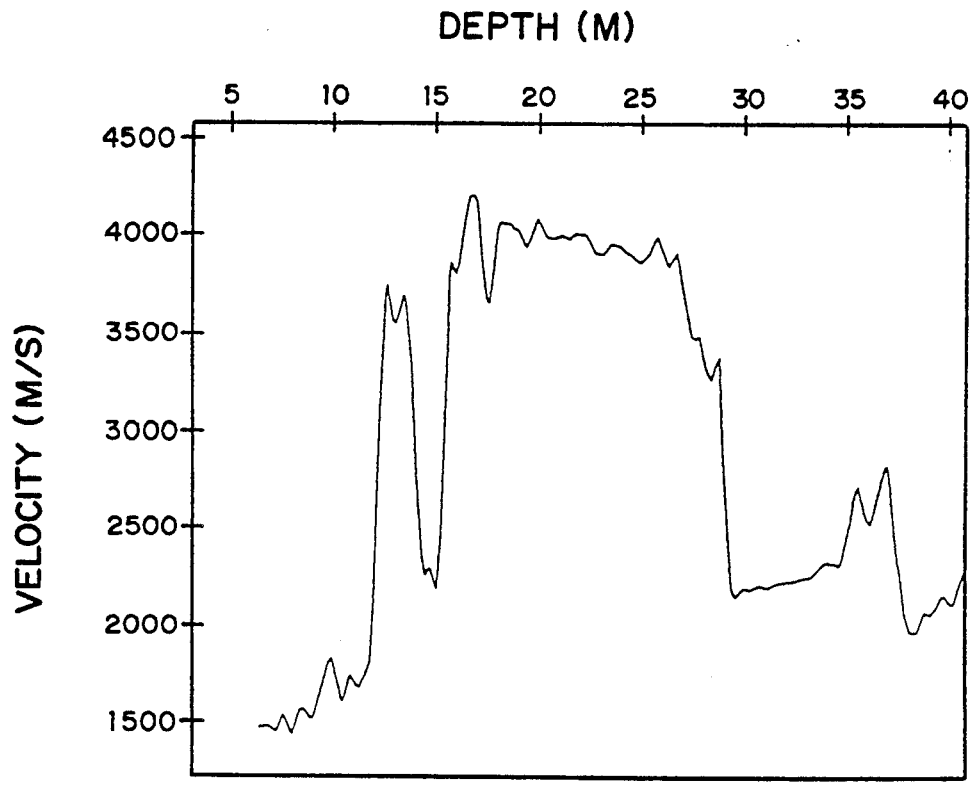
FIG. 2 is a graphical representation of a velocity well log from an oil well containing seismic receivers.

FIG. 2 shows a compressional (sonic) velocity log for the well containing receivers. This log shows the high velocity of the Ft. Riley limestone, which ranges from fifteen to thirty meters in depth. An overlying limestone, approximately two meters thick, is narrower than the shortest spatial wavelength and cannot carry significant refracted energy. Surrounding shales have less than half the velocity of the limestones.

Figure 3:
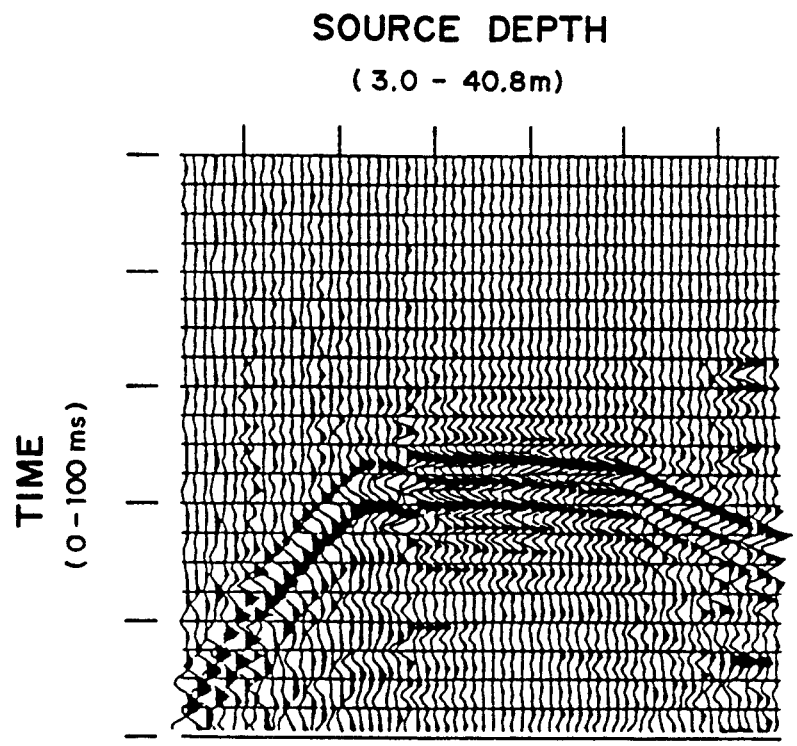
FIG. 3 is a seismogram of a common receiver shear wave gather for a single receiver.

FIG. 3 shows a typical shear-wave gather for a common receiver at thirty-eight and three tenths meters in depth. Sixty-three traces, from left to right correspond to increasing source depths from three to forty and eight tenths meters. Ten fixed receivers ranged from nine and one tenth to forty-two meters in depth. Deconvolution of the recorded source waveform has compressed the data into one hundred milliseconds with a bandwidth of seventy to two hundred eighty Hertz. Shear data has twice the resolution of compressional data.

Only first arrivals can be picked and correlated with some confidence. The flat central arrivals correspond to source positions in the high-velocity Ft. Riley limestone (approximately two thousand meters per second). Low-velocity shales produce steep events. The slight ringing of waveforms has been modeled elastically as a sequence of many overlapping arrivals. At two hundred eighty Hertz, a seven and six tenths spatial wavelength in the limestone and less than half this length in shales is expected.

Figure 4:
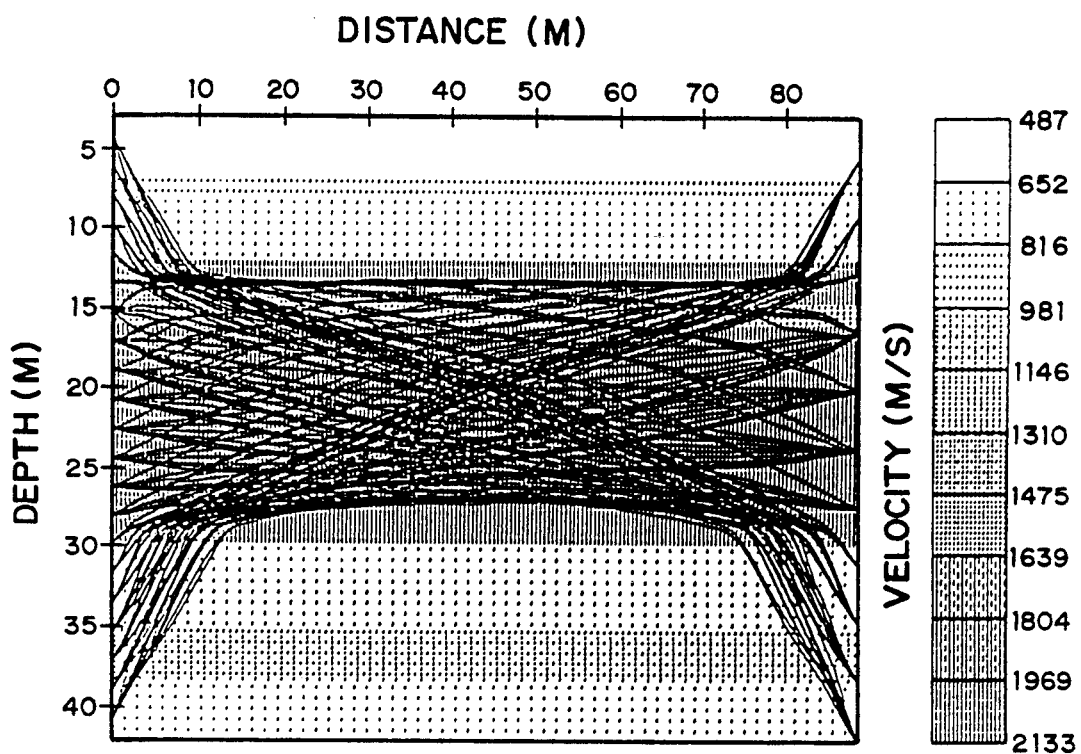
FIG. 4 is a collection of wave paths from every third source to all receivers.

FIG. 4 shows a model of fastest paths between every third shot (left) and all available receivers (right). The stratified shear velocity model (not logged directly) was proposed by a geologist from other available information. Notice that all paths pass through the limestones. Large regions of the shales receive no coverage at all. Also, the angles of paths through the limestone do not vary as much as would the angles of straight lines.

These plotted "wavepaths" required numerical tools that addressed two problems. First, wells are separated by only twelve and a half wavelengths, so thin raypaths are a poor approximation. Second, waves are bent considerably, so either refracted or direct arrivals can arrive first.

According to Huygen's principle, wave energy effectively travels along all possible paths between two points, including those that ignore Snell's law. In the optical approximation (infinite frequencies), however, all significant contributions of energy follow paths that obey Fermat's principle and locally minimize the traveltime.

On the other hand, band-limited waves can follow paths that are not Fermat raypaths and still cover the distance between two points in almost the same time. All arriving waves that are delayed by less than half a wavelength will add constructively to the first arrival. These data have a minimum temporal wavelength of three and six tenths milliseconds. Thus, any waves that arrive in less than one millisecond of each other will be indistinguishable. Errors in picking first-arrival times will be even greater.

Figure 5:
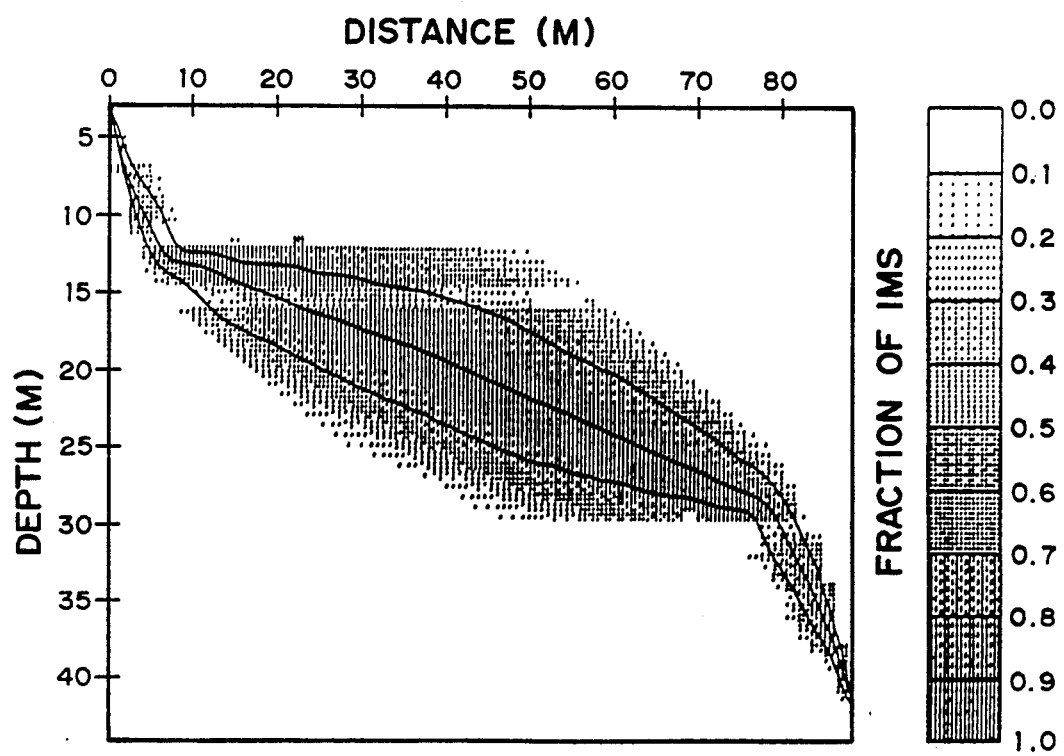
FIG. 5 is a plot of a wave path between one shot and one receiver.

FIG. 5 shows a gray region that contains many possible paths between a shallow source and a deep receiver. Each of these paths has a total traveltime no more than one millisecond greater than the minimum possible traveltime, according to the geologist's velocity model. Three plotted lines show a central "median" path and the approximate half-width of this region. The gray region bends sharply at the edge of the high-velocity layer and then broadens. High velocities allow greater variations in the path because these variations affect traveltimes less.

Wave paths were calculated in the present invention using a new, but uncomplicated method.

First, with an explicit scheme, minimum traveltimes are extrapolated from one source position to each point in the region of interest. Explicit schemes include finite-difference extrapolation of the Eikonal equation (Vidale, 1989), or the "graph theory" method of Moser, 1989, which is used in the present invention. Similarly, traveltimes from one receiver location to each point in the region of interest are extrapolated.

Second, the extrapolated travel times from source and receiver are added together. The resulting table shows the traveltimes of paths which are obliged to pass through particular points in the model. The global minimum traveltime of this table is the minimum traveltime between the source and receiver. This minimum is realized at both the source and receiver locations and also at each point along the Fermat raypath with global minimum traveltime.

Third, all points in the model whose tabulated traveltimes exceed the minimum traveltime by less than half a temporal wavelength are found. This region is called the wave path of the first arrival. A smooth path that passes through the center of this region has a traveltime that differs little from that of the Fermat raypath. This representative "median" path is used for modeling traveltimes and tomographically improving velocities. The variable width of the path can be preserved as well.

The smoothest, most horizontally stratified velocity model possible to explain picked traveltimes is found. The resolution of inverted velocities will be limited by source bandwidth, by the distribution of our measurements, and by errors in the positioning of wave paths. Sharper details (higher spatial frequencies) are added to the velocity model only if smoother models will not explain the data. Also, in such a geologically stratified region as at the Borehole Test Facility where the data was obtained, more two-dimensional complexity than necessary should not be added. Since many possible models may explain the data equally well, the simplest, both mathematically and geologically is chosen.

To control the resolution of the model, the reciprocal of velocity is constrained as a sum of smooth basis functions. The widths of these basis functions can be narrowed as wave paths are improved, allowing sharper changes in velocities. Slowness is more convenient to evaluate than velocity because traveltime is an integration of slowness along the length of a path.

If $s_{ij}$ represents the slowness of node points, then the slowness at spatial coordinates x and z will be $$s(x,z) = \sum_i \sum_j s_{ij} dx^{-1} dz^{-1} f[(x - idx)/dx] f[(z - jdz)/dz].$$

dx and dz are the spatial sampling rates of the nodes. The term f(x) represents a bell-curve of unit area and unit width, such as a Gaussian or third-order polynomial.

To improve a particular slowness model, the perturbations are constrained with an appropriate density of basis functions, depending on the accuracy and width of estimated wave paths. Optimized perturbations can then be added to a gridded reference slowness model of fixed sampling (Sixty by sixty for these data). Alternating improvements in paths and slowness will allow an increasing density of basis functions.

Let us begin with the simplest possible model. First, the fact that paths are straight lines is assumed. Second, a single average slowness is assumed. The slowness perturbation is constrained with only three basis functions over depth and with no lateral variation at all.

Errors between picked and modeled first-arrival times are minimized by optimizing slowness perturbations with a conjugate-gradient algorithm (Luenberger, 1984; Scales, 1987). This algorithm requires that forward modeling and its numerically adjoint operation, back projection are alternately performed. Forward modeling links two steps, first, gridding smooth slowness values from basis functions, and second, integrating traveltimes from slowness along known paths. Both operations are linear. The adjoint reverses these steps by first, perturbing slowness along the paths with values proportional to errors in traveltime, and second, finding perturbations of basis functions from weighted sums of gridded values.

Figure 6:
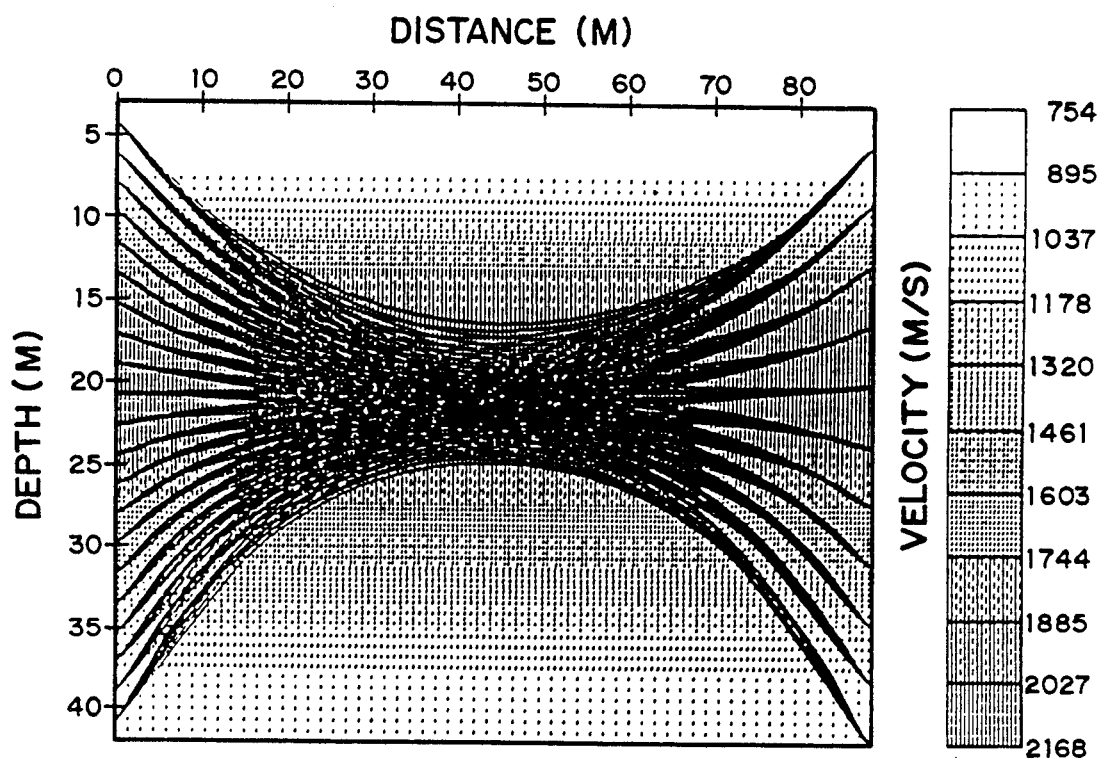
FIG. 6 is a plot of estimated wavepaths after one iteration using the present invention.
Figure 7:
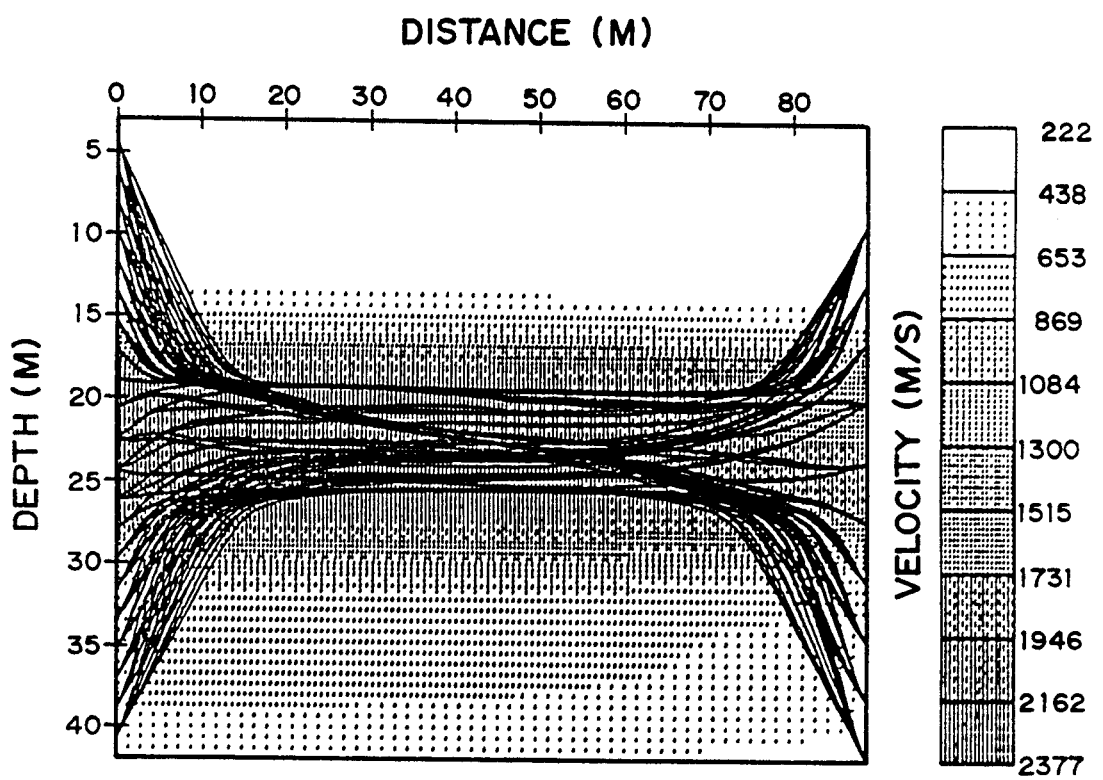
FIG. 7 is a plot of an estimated two dimensional velocity model and its corresponding wavepaths.

FIG. 6 shows the first revised velocity model and re-estimated wavepaths, which have been drastically repositioned towards the higher velocity center. Each succeeding re-estimate of velocities allowed an increasing number of up to twenty-five vertically variable basis functions until an optimal one dimensional solution was obtained. Then, beginning again with smooth perturbations, a two-dimensionally variable velocity function was optimized (FIG. 7).

The bottom of the Ft. Riley is positioned as expected, but no thin shallow limestone appears above fifteen meters depth. Shallow velocities are much slower than expected. Modeled traveltimes had an error less than one and eight tenths milliseconds. This was within one temporal wavelength and the expected picking error. This model fits the picked data only two tenths millisecond better than the entirely stratified model. If a two dimensional velocity model were directly optimized, the imprint of an hour glass shaped distribution of raypaths would be the result. Instead, the stratified model has extrapolated reasonable velocities into regions not covered by first arrivals.

Estimated shear velocities from cross-well data showed vertical resolution of approximately three meters for a seventy to two hundred eighty Hertz bandwidth. Estimated lateral changes were insignificant, as expected in this geologically stratified area. An entirely stratified model explained the picked traveltimes to within the picking error.

Because of large velocity contrasts, first arriving waves did not pass through large regions of low velocity shales. The margins, but not interiors, of these shales were resolvable from neighboring refractions. Only the interior of a high velocity limestone received much angular coverage. Geologic layers did not carry any detectable refracted waves when thinner than the shortest seismic wavelength.

The estimated interval velocity function extrapolated reasonable values into regions of poor ray coverage by converging first on the long spatial wavelengths and by encouraging stratification. Estimated wavepaths guide the interpretation of non-uniqueness and resolution.

This method was used to estimate shear-wave seismic velocities between two ground-water wells in Kay Country. Seismic sources were placed at multiple depths in one well and were recorded by receivers at multiple depths in another well. This situation is analogous to applications of tomography in many other fields.

However, existing tomographic methods did not easily account for strong ray bending or for the effect of band limited sources on resolution.

Certain geological strata had more than twice the velocity of other strata. As a result, most waves that arrived first had been strongly refracted through faster layers and often arrived before direct unrefracted waves. Paths were bent considerably.

Moreover, the wells were separated by less than fifteen seismic wavelengths, which seriously affected the resolution of local velocities from inversions of recorded traveltimes.

Reflected paths can be estimated similarly when reflection points are known or are iteratively re-estimated. The path from source to reflection point and from reflection point to receiver can be estimated independently and then concatenated. A known reflecting surface can be treated as a collection of reflecting points.

Alternatively, one can create four tables of traveltimes for each source and receiver pair. Two tables (A) contain transmitted traveltimes from the source and receiver to all points on a reflecting surface, as before. Two additional tables (B) contain traveltimes that have been extrapolated from this surface to all points in the region of interest--one table beginning from transmitted traveltimes for the source, and another beginning from traveltimes for the receiver. The A table for the source should be added to the B table for the receiver, and vice versa, to give the total traveltimes before and after reflection. The analysis of wavepaths then proceeds as before.

In summary, the method of the present invention con be stated as follows.

First, from recorded data, the earliest traveltimes of waves transmitted between different source and receivers locations are selected.

Second, a velocity model that describes transmission velocities in the region of interest is proposed. This should cover all regions between source and receiver locations.

Third, with an explicit scheme, traveltimes from each source position to each point in the region of interest are extrapolated.

Fourth, similarly, traveltimes from each receiver location to each point in the region of interest are extrapolated.

Fifth, to quantify the path of a wave between one source and one receiver, the extrapolated traveltimes from the source and receiver to each point in the region of interest are added together.

Sixth, all points in the region of interest whose total traveltimes are less than half a wavelength greater than the minimum traveltime are found.

Seventh, for each source and receiver location, a representative raypath that passes through the center of the estimated wavepath region is saved.

Eighth, the previous model of velocities is improved by tomographic means (back projections) to increase the match between the recorded and modeled traveltimes along the representative raypaths.

Ninth, using the improved velocity model, return to step three and re-estimate wavepaths.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

We claim:

1. A method of estimating seismic transmission velocities by determining seismic wavepaths from traveltime tables comprising the steps of:
   obtaining seismic data from seismic pulses generated by sources into the earth's surface and detected by receivers;
   picking the earliest traveltimes of waves transmitted between different source and receiver locations for a region of interest which includes any region which may influence a wavepath;
   selecting a velocity model that describes transmission velocities in the region of interest;
   extrapolating first traveltimes from each source position to each point in the region of interest;
   extrapolating second traveltimes from each receiver location to each point in the region of interest;
   quantifying the path of a wave between one source and one receiver by adding together the extrapolated first and second traveltimes from the source and receiver to each point in the region of interest;
   determining all points in the region of interest whose total traveltimes are less than half a wavelength greater than a predetermined minimum traveltime thereby determining an estimated wavepath region;
   retaining a representative raypath that passes through the center of the estimated wavepath region for each source and receiver location; and
   improving said model of velocities by tomographic means to increase the match between the recorded and modeled traveltimes along the representative raypaths.

2. The method according to claim 1 also including the steps of:
   using the improved velocity model, repeating said steps of extrapolating said first traveltimes, extrapolating said second traveltimes, quantifying, determining, retaining and improving to re-estimate wavepaths.

3. The method according to claim 1 wherein said retaining step also includes the step of:
   preserving the variable thickness of the wavepath.

4. A method of estimating seismic transmission velocities by determining seismic wavepaths from traveltime tables comprising the steps of:
   obtaining seismic data representing seismic pulses produced by sources and detected by receivers;
   selecting the earliest traveltimes of waves transmitted between different source and receiver locations for a region of interest which includes any region which may influence a wavepath;
   selecting a velocity model that describes transmission velocities in the region of interest;
   extrapolating traveltimes from each source position to each point in the region of interest and traveltimes from each receiver location in each point in the region of interest;
   adding together the extrapolated traveltimes from the source and receiver to each point in the region of interest to quantify the path of a wave between one source and one receiver;
   determining all points in the region of interest whose total traveltimes are less than half a wavelength greater than a predetermined minimum traveltime;
   retaining a representative raypath that passes through the center of the region for each source and receiver location; and
   improving said model of velocities by tomographic means to increase the match between the recorded and modeled traveltimes along the representative raypaths.

5. The method according to claim 4 also including the steps of:
   using the improved velocity model, repeating said steps of extrapolating, quantifying, determining, retaining and improving to re-estimate wavepaths.

6. The method according to claim 4 wherein said retaining step also includes the step of:
   preserving the variable thickness of the wavepath.

7. An apparatus for improving estimating seismic transmission velocities by determining seismic wavepaths from traveltime tables comprising:
   means for obtaining seismic data representing seismic pulses produced by sources and detected by receivers;
   means for selecting the earliest traveltimes of waves transmitted between different source and receiver locations for a region of interest which includes any region which may influence a wavepath;
   means for selecting a velocity model that describes transmission velocities in the region of interest;
   means for extrapolating traveltimes from each source position to each point in the region of interest and traveltimes from each receiver location to each point in the region of interest;
   means for adding together the extrapolated traveltimes from the source and receiver to each point in the region of interest to quantify the path of a wave between one source and one receiver;
   means for determining all points in the region of interest whose traveltimes are less than half a wavelength greater than a predetermined minimum traveltime;
   means for retaining a representative raypath that passes through the center of the region for each source and receiver location; and
   means for improving said model of velocities by tomographic means to increase the match between the recorded and modeled traveltimes along the representative raypaths.

* * * * *